June 27, 1950 W. T. POWELL 2,513,049

AUTOMATIC COMBINED CODER AND TIMED RELEASE TELEPHONE SYSTEM

Filed Sept. 17, 1946 5 Sheets-Sheet 1

INVENTOR.
WINFRED T. POWELL

BY T. L. Bowes

ATTORNEY

INVENTOR.
WINFRED T. POWELL
BY J. L. Boivin
ATTORNEY

June 27, 1950 W. T. POWELL 2,513,049

AUTOMATIC COMBINED CODER AND TIMED RELEASE TELEPHONE SYSTEM

Filed Sept. 17, 1946 5 Sheets-Sheet 3

LINE CONNECTOR

INVENTOR.
WINFRED T. POWELL

BY T. L. Bowes

ATTORNEY

June 27, 1950 W. T. POWELL 2,513,049

AUTOMATIC COMBINED CODER AND TIMED RELEASE TELEPHONE SYSTEM

Filed Sept. 17, 1946 5 Sheets-Sheet 4

INVENTOR.
WINFRED T. POWELL

BY T. L. Bowes

ATTORNEY

June 27, 1950

W. T. POWELL 2,513,049

AUTOMATIC COMBINED CODER AND TIMED RELEASE TELEPHONE SYSTEM

Filed Sept. 17, 1946

5 Sheets-Sheet 5

INVENTOR.
WINFRED T. POWELL

BY T. L. Bowes
ATTORNEY

Patented June 27, 1950 2,513,049

UNITED STATES PATENT OFFICE 2,513,049

AUTOMATIC COMBINED CODER AND TIMED RELEASE TELEPHONE SYSTEM

Winfred T. Powell, Rochester, N. Y., assignor to Stromberg-Carlson Company, a corporation of New York Application September 17, 1946, Serial No. 697,430

8 Claims. (Cl. 179—17)

Figures 1, 2:
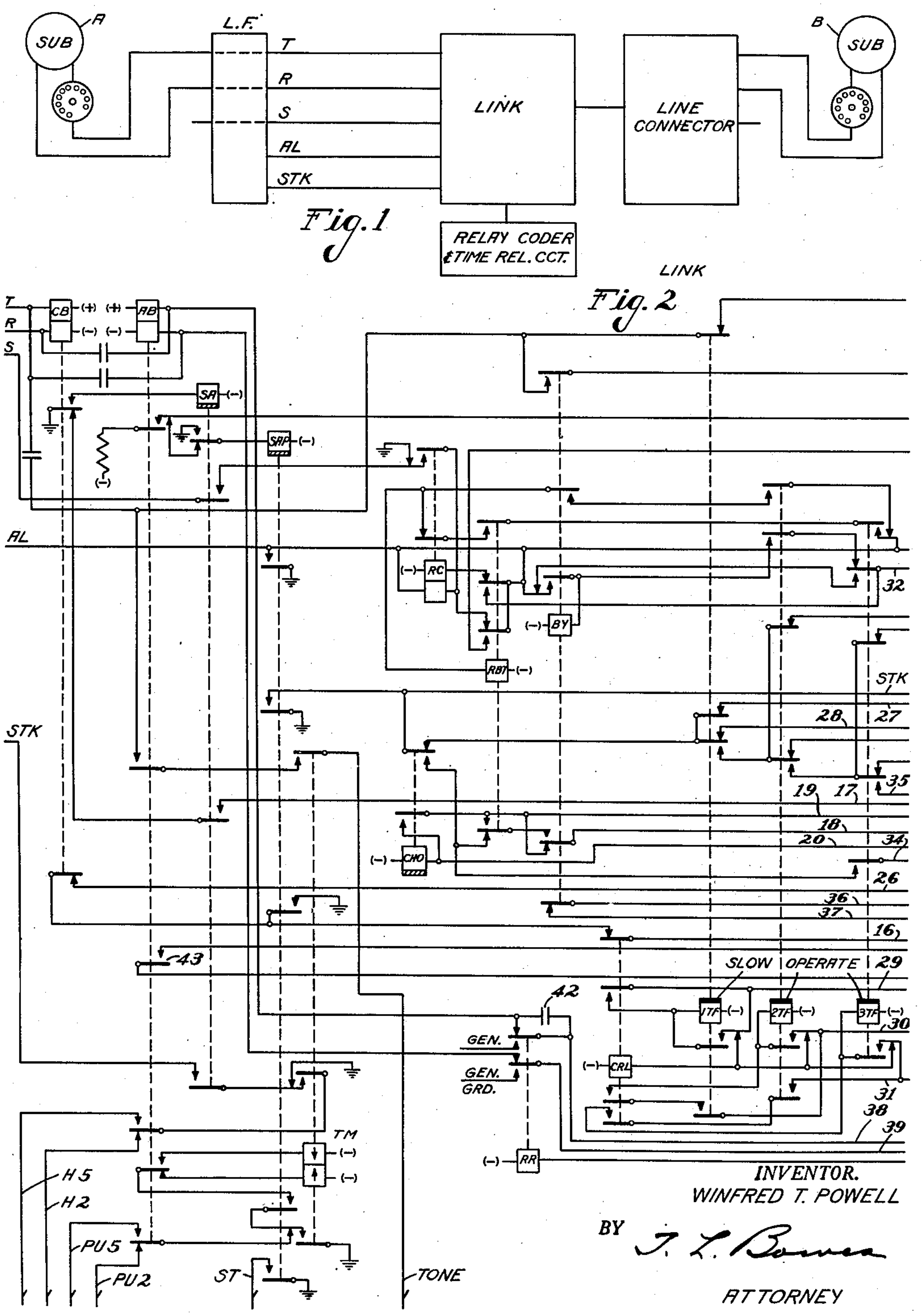

This invention relates in general to automatic telephone systems, but it more particularly pertains to small systems suited for installation in towns or villages. An automatic telephone system of this type is generally known as a C. A. X. and may have a capacity of ten lines, for example. Usually the lines are party lines having either bridged or grounded ringing circuits over which subscribers are signalled by means of code ringing. Provision is also usually made for trunking calls to and from distant exchanges.

The main object of the present invention is the provision of a combined common relay type code interrupter and a relay type time release circuit for use in controlling the connector link circuits, which may preferably also be of the all relay type.

Other objects and advantages of the present invention will be set forth in the specification and claims and shown in the drawings. The characteristic features will be explained more in detail in the following description of one embodiment of the invention, while various other features and advantages of the system comprising this invention will be in part pointed out and in part apparent as the description progresses. For the purpose of simplifying the drawings and facilitating the explanation, various parts and circuits have been diagrammatically shown and certain conventional illustrations have been employed. The drawings have been made more with the purpose of making it easy to understand the principles and mode of operation, than with the idea of illustrating the specific construction and arrangement of parts and circuits that would be employed in practice. Thus the various relays and their contacts are illustrated in a conventional manner, the use of symbols being employed to indicate the connections to the terminals of batteries, or other sources of current, instead of showing all the wire connections to these terminals.

The symbol (—) indicates the negative terminal of the battery or other suitable source of current, while the positive terminal of this same source is illustrated by the usual ground symbol.

In describing the invention in detail, reference will be made to the accompanying drawings which illustrate in a diagrammatic manner the apparatus and circuits employed. Those parts having similar features and functions are designated in the different figures by similar reference characters.

The complete line circuit, line finder circuit and allotter circuit have been omitted from the present showing since they form no part of the present invention. It will be obvious that any of the well known circuits of this type may be used, one preferred arrangement of the all relay type being shown in Powell Patent 2,325,877, issued August 3, 1943.

Referring to the drawings, Figure 1 illustrates in diagrammatic manner the usual arrangement by means of which a calling subscriber A is connected to an idle link circuit by way of an associated line finder L. F., after which the connection is extended in response to dialed impulses by way of the line connector, associated with the chosen link, to called subscriber B. As indicated in Figure 1, a common relay type coder and time release circuit is associated with the link circuit in use when the functions of this coder and time release circuit are required in connection with the call in progress.

The remaining figures are arranged with Figs. 2, 3, and 4 in this order from left to right, with Fig. 5 directly below Fig. 2, and Fig. 6 directly below Fig. 3. By placing the figures in this order and with correspondingly numbered lines in alignment the tracing of the detailed circuits will be facilitated.

Figure 3:
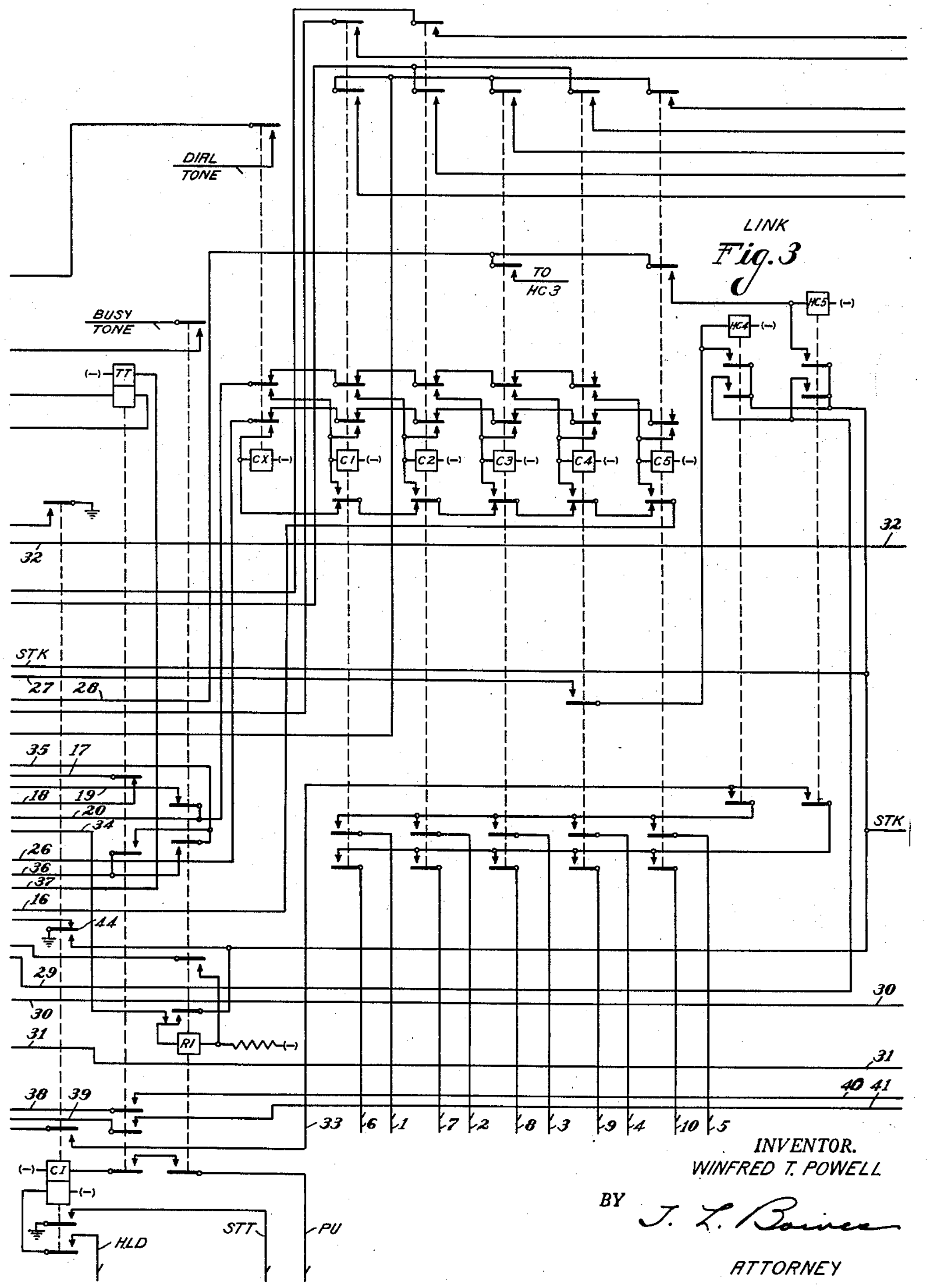
Figure 4:
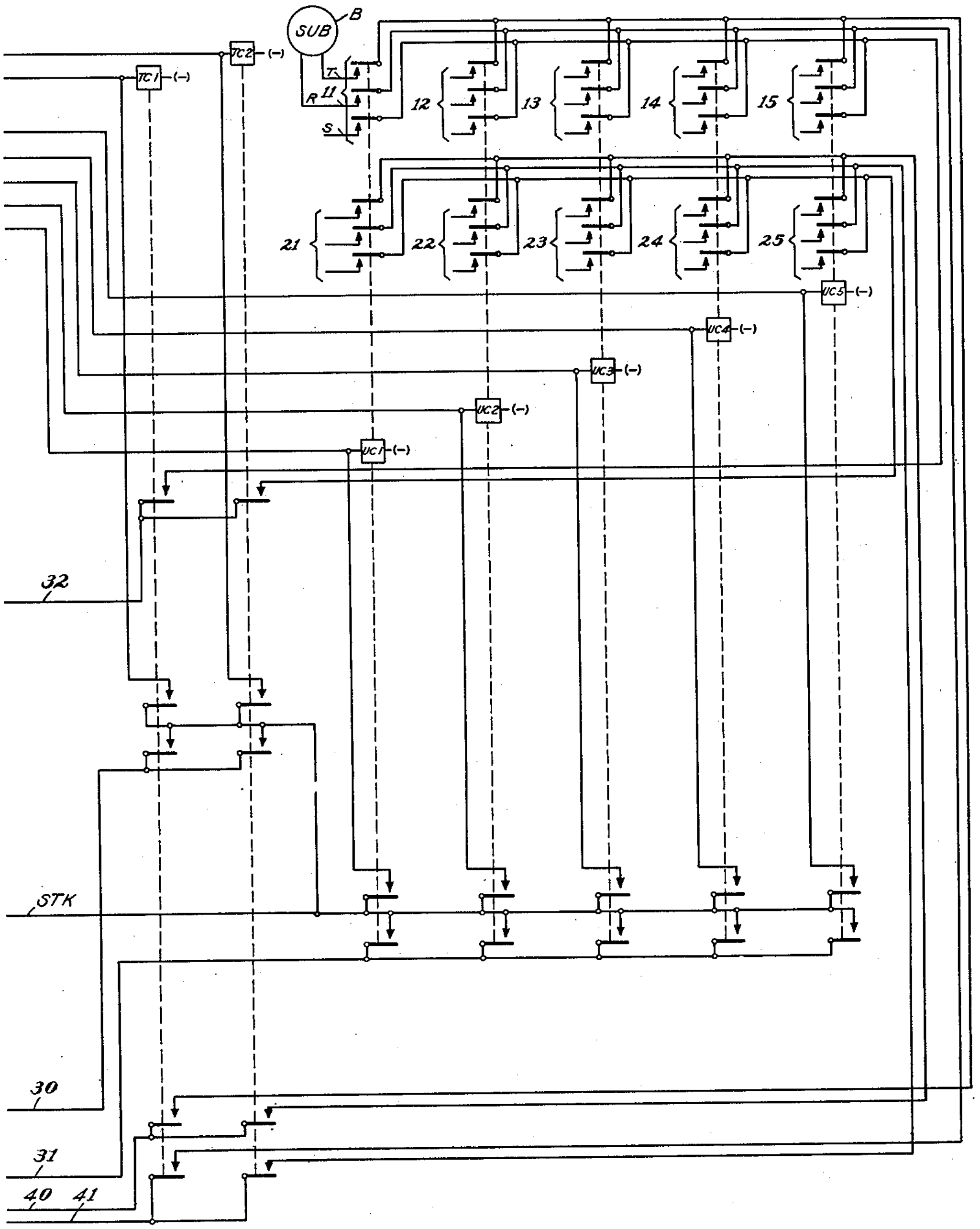

Since the present invention is concerned with the connector portion of a link in a relay type automatic telephone system, one such connector is illustrated complete in Figs. 2, 3 and 4. Furthermore, since the present invention is concerned with the common code ringing and the common permanent signal and conversation time release apparatus and circuits for cooperating with any of the connector links, such as the one illustrated in Figs. 2, 3 and 4 to provide code ringing of the called stations and the automatic release of permanent signal and conversation timed connections, the complete relay type coder and timer is illustrated in Figs. 5 and 6. Relays A, B and C of Fig. 5 comprise a pulse generator for supplying pulses for stepping the counting relays XC1—XC16 through cycles to provide time out pulses for the time release of a connector under various conditions and to provide pulses for operating common channel relays 1CH—7CH in proper combinations for providing coded pulses for code ringing called lines by variably operating a connector ringing relay RR, all in a manner which will be explained in detail.

In describing the operation of this invention in detail, it will be assumed that the calling subscriber A is connected to the link circuit of Fig. 2, in response to the removal of the receiver, in the manner pointed out in the above mentioned Powell patent. Tip, ring and sleeve conductors of the calling line are thus extended to the link circuit and when relays SA and SAP are operated, as will be later described, ground is applied to allotter conductor AL for making this link busy and to stick conductor STK for holding the line finder in connection with the calling line until the connection is released.

The closed circuit across the calling line conductors effects the operation of calling bridge relay CB which closes an obvious circuit for operating slow acting relay SA. Relay SA closes an obvious circuit for operating slow acting repeater relay SAP. Relay SAP closes a circuit through its inner lower make contact and middle upper back contact of relay RBT, for operating reverting call relay RC. The operation of relay SAP also closes a circuit from ground, make contact of this relay, break contact of relay CRL, conductor 16, break contacts in series of relays C5, C4, C3, C2, and C1 to the winding of relay CX for operating this latter relay. Relay CX connects dial tone to the calling line as an indication that dialing may begin.

The calling party now dials the first or hundreds digit which, for example, may be number 2, resulting in relay CB being released twice after which it remains operated. The first release of relay CB closes a circuit for operating counting relay C1 which extends from ground, break contact of relay CB, make contact of relay SA, conductor 17, break contact of relay TT, conductor 18, break contact of relay BY, conductor 19, break contact of relay RI, make contact of relay CX and winding to relay C1 to negative battery. A circuit is also closed at this time for operating changeover relay CHO which may be traced from the above mentioned break contact of relay RI, conductor 20 and winding of relay CHO to negative battery. To prevent the release of relay CHO when relay RI is operated during impulsing (as will be later explained), the make contact of relay CHO bridges conductors 19 and 20 for providing a substitute holding circuit for this relay.

When relay CB is energized at the end of the first impulse, relay CX is released because its operating circuit is opened at a break contact of relay C1. Referring back to the release of relay CB at the beginning of this first impulse, relay CX is locked in its operated position by way of a circuit extending from ground, make contact of relay SAP, break contact of relay CB, conductor 26, make contact and winding of relay CX to negative battery. With relay CX released, as above mentioned, the dial tone is disconnected from the calling line and since relay ITF will be operated before relay CX is next operated, this dial tone circuit is maintained disconnected throughout the remainder of the connection.

In response to the remaining impulse of the first digit, relay CB is released, with the release operation of this relay extending ground by way of conductor 26, through a make contact of relay C1 for locking this relay operated, while the circuit from ground on conductors 17, 18 and 19 is extended through break contact of relay CX and make contact of relay C1 to the winding of counting relay C2 for operating this relay. The lower inner make contact of relay C2 closes a locking circuit for this relay to conductor 16 and the lower inner break contact of relay C2 opens the locking circuit including this conductor which was extended to relay C1. Relay C1 does not release at this time, however, because of the above described locking circuit.

It is believed that the above explanation of the control of the counting relays by the transmitted impulses is sufficient to indicate how these relays are progressively operated, with the counting relay numbered in correspondence with the number of the impulses in the transmitted digit being left operated at the end of the series of impulses. Furthermore, it will be observed that relay CHO is operated at the beginning of the series of impulses and is released at the termination of the series because ground is removed from conductors 17, 18, 19 and 20 by relay CB remaining energized long enough to permit relay CHO to be released.

In this particular system it will be assumed that #3 is dialed for the first digit to select an interoffice trunk, or the like, when this particular system operates in connection with interoffice trunking, however, since such trunk service circuits form no part of the present invention they will be omitted from this explanation. The reference characters associated with the make contact of counting relay C3 indicates a connection to the hundreds connector relay HC3, if and when provided.

Assuming that this is a four-digit system, the first code ringing group will be selected by digit 4 and the second code ringing group will be selected by digit 5. This is accomplished by the provision of two relays HC4 and HC5 which respond to the above mentioned first digits respectively. Tens connecting relays TC1 and TC2 of Fig. 4 are selectively responsive to the second digit (#1 or #2), since it is assumed that there are two tens groups of five lines each selected by the line connector. The third digit (1, 2, 3, 4 or 5) selectively operates any one of the units connecting relays UC1 to UC5 inclusive, with the particular line of each pair selected by the units connector relay being individually selected by the particular tens connecting relay operated by the tens digit. The fourth digit selects any one of ten code ringing circuits, with the ten common code conductors being shown leading from the bottom of Fig. 3. Lines 9 and 10 are omitted from Fig. 6 in order to simplify the drawings. It will be clearly understood from the description which follows how conductor 9 could be grounded by relays 1CH and 3CH to provide two short rings and how conductor 10 could be grounded by relays 1CH, 3CH and 5CH to provide three short rings.

It will now be assumed that the first digit dialed is #4. This means that counting relay C4 will be in its operated position and the other counting relays of the group will be in their released positions when relay CHO is released at the end of the first digit. A circuit is now closed for operating hundreds connector relay HC4 which extends from ground, make contact of relay SAP, break contact of relay CHO, break contact of first transfer relay 1TF, conductor 27, make contact of counting relay C4 and winding of relay HC4 to negative battery. Relay HC4 operates and closes a locking circuit for itself which extends by way of stick conductor STK to ground at make contact of relay SAP.

It will be observed that relay HC5 would have been operated when relay CHO released in the event that the first digit was #5 instead of #4, as in the above example. The circuit for operating relay HC5 would have extended through another break contact of relay 1TF, conductor 28, and make contact of counting relay C5 (left operated when the first digit is #5) and winding of relay HC5 to negative battery.

The operation of relay HC4 extends the grounded stick conductor STK to conductor 29, which leads back through break contact of the make before break combination of relay 1TF to counting release relay CRL for operating this relay. Relay CRL closes a circuit for operating relay 1TF which extends from grounded conductor 29, make contact of relay CRL and winding of relay 1TF to negative battery. Relay 1TF closes a locking circuit for itself by bridging the above mentioned make contact of relay CRL, at the same time that it opens the above described operating circuit for relay CRL, which effects the release of this latter relay.

During the time that relay CRL is operated, the ground connection on conductor 16 is opened at a break contact of relay CRL for effecting the release of the counting relay left operated. When relay CRL releases, the above circuit for operating relay CX is again closed to grounded conductor 16.

The tens digit is next transmitted and in response to the impulses of this digit the counting relays are again operated, with relay CHO being operated at the beginning of the series and released at the end of this series of impulses. At the termination of the tens series of impulses and the consequent release of relay CHO a circuit is closed for operating the selected tens connector relay TC1 if the tens digit is #1 and TC2 if the tens digit is #2. The particular TC relay which is operated is locked in its operated position by means of a circuit extending from ground on conductor STK and the make contact of the particular selected TC relay. At the same time, this grounded conductor STK is extended back by way of conductor 30 and break contact of the second transfer relay 2TF to the winding of relay CRL for operating this relay. The operation of relay CRL extends grounded conductor 30 by way of a make contact of relay 1TF and a make contact of relay CRL to the winding of relay 2TF for operating this relay, which in turn completes a locking circuit for itself at its make before break contact to grounded conductor 30 at the same time that it opens up and releases relay CRL.

The operation of relay CRL again opens up conductor 16 for effecting the release of the counting relay left operated and when relay CRL is released, relay CX is again operated to prepare the counting relay circuit for the units digit.

In response to the series of impulses making up the units digit, relay CB is again intermittently released for sequentially operating the counting relay chain and when relay CB remains operated at the termination of this series of impulses the sounding relay corresponding to the number of impulses in this digit is left operated. Relay CHO is again operated and released, the release of this relay closing a circuit for operating the UC relay which corresponds to the number of impulses in the units digit. The operation of the selected UC relay connects the grounded conductor STK to the winding of this relay for locking it in its operated position and extends conductor STK back by way of conductor 31 and break contact of the #3 transfer relay 3TF to relay CRL for again operating this relay. The operation of relay CRL extends grounded conductor 31 through a make contact of relay 2TF and a make contact of relay CRL to the winding of relay 3TF, which operates and locks this relay at its make before break spring combination and opens up and releases relay CRL for again releasing the counting relay left operated, after which relay CRL releases for again operating relay CX to prepare the counting relay circuit for the last or station digit.

It is not believed necessary to explain the operation of the circuit when a busy line is selected, since this feature forms no part of the present invention and since it has been pointed out in detail in the above mentioned Powell patent. It will be assumed that the called line is idle when relay 3TF is operated after the units digit is received. It will further be assumed that line #11 connecting to substation B of Fig. 4 is selected, which means that relay UC1 is operated in combination with tens relay TC1. It will be obvious from the line numbers associated with the UC relays of Fig. 4 how the five lines having tens digit #1 are selected by relay TC1 in combination with any one of the UC relays and how the other five lines having tens digit #2 are selected by means of the same UC relays in combination with relay TC2.

With relays TC1 and UC1 operated in response to the transmission of the tens and units digit and the operation of relay 3TF, sleeve conductor S of line #11 is extended through make contact of relay UC1, make contact of relay TC1, conductor 32, make contact of relay 3TF, break contact of relay BY and make contact of relay SAP to ground. This ground applied to sleeve conductor S of the called line makes this line busy to other calls and operates the usual cut off relay of the called line.

It will first be assumed that relay HC4 was operated in response to the hundreds digit when the line having tens digit 1 and units digit 1 is selected. This means that code ringing common conductor 1 is connected to ringing conductor 33 for operating ringing relay RR over a circuit which will be later described. If relay HC5 is operated in response to the first digit, in combination with counting relay C1 for the station digit, then ringing conductor 33 will be extended to common code conductor 6. It will thus be obvious that relay HC4, operated when the hundreds digit is #4, extends the ringing circuit of the link to common code ringing conductors 1 to 5, inclusive and that relay HC5, operated when the first digit is #5, extends the link ringing conductor 33 to common code conductors 6 to 10, inclusive, these common code conductors being selectively extended to the contacts of the HC relay by the counting relay left operated by the station digit.

When the station digit is dialed, relay CB functions to operate the counting relay chain in the previously described manner, with relay CHO being operated at the beginning of this digit and released at the end of the digit. The operation of relay CHO closes a circuit for operating ringing relay RI which extends from ground, make contact of relay SAP, make contact of relay CHO, make contact of relay 3TF, conductor 34, break contact and winding of relay RI and resistance to negative battery. Relay RI extends the grounded conductor STK to its winding by means of its make before break contact for locking this relay in its operated position. It will be noted that relay RI is operated at the beginning of the station digit impulses. At the end of the station series of impulses the release of relay CHO closes a circuit for operating test relay TT which extends from ground, make contact of relay SAP, break contact of relay CHO, make contacts in series of relays 1TF, 2TF and 3TF, conductor 35, make contact of relay RI, conductor 36, break contact of relay BY, conductor 37 and upper winding of relay TT to negative battery. Relay TT closes a bridge point across the above mentioned make contact of relay RI, which is effective to lock relay TT in its energized position.

When pick-up conductor PU is grounded at the beginning of the code ringing cycle, as will be later explained, this grounded pulse is extended through make contacts of relays RI and TT to the upper winding of relay CI for operating this relay. Relay CI locks itself operated to the grounded hold conductor HLD, this conductor being maintained in its grounded condition until the completion of this code ringing cycle, thus holding relay CI in its operated position by way of its lower winding.

With relay CI operated, ringing conductor 33 is extended to ringing relay RR so that this relay is intermittently operated in accordance with the selected code for applying ringing generator to the selected called line in accordance with this code. This generator circuit extends through make contacts of relay RR, conductors 38 and 39, make contacts of relay TT, conductors 40 and 41, make contacts of relay TC1, make contacts of relay UC1 and the called subscriber's line for ringing the bell of the stations on this line in accordance with the selected code. Small condenser 42 bridged across the upper break contact of relay RR permits a small portion of the ringing current to flow back over the calling line to give the calling party an indication that the called station is being rung.

When the called party answers, the called line circuit, extended by way of break contacts of relay RR to the windings of relay AB effects the operation of relays AB for short-circuiting and releasing relay RI and terminating the ringing signal. It will be noted that relay CI must be in its released position, thus indicating the interval between the code cycles, before relay AB can effect the release of relay RI. This is because the contact #43 of relay AB cannot be effective if relay CI is operated because its contact #44 will then be open.

Conversation is carried on in the usual way and the release of the connection is effected by the calling party hanging up and releasing relay CB which effects the release of relays SA, SAP and RC. It will be understood that relays RC and RBT perform no functions in connection with a call of this type, these relays being of use only in connection with a reverting call, which forms no part of the present invention and which is fully explained in connection with the above mentioned Powell patent.

The release of relays SA and SAP effect the release of all other relays used in connection with this call by opening up the connection to ground which is used to hold these relays in their operated positions. Consequently, the counting relays will be released, the particular HC relay which was operated will be released, the TC and UC relays will be released, the TF relay will be released, the TT relay will be released, the AB relay will be released and the called line circuit will be restored to normal.

Figure 5:
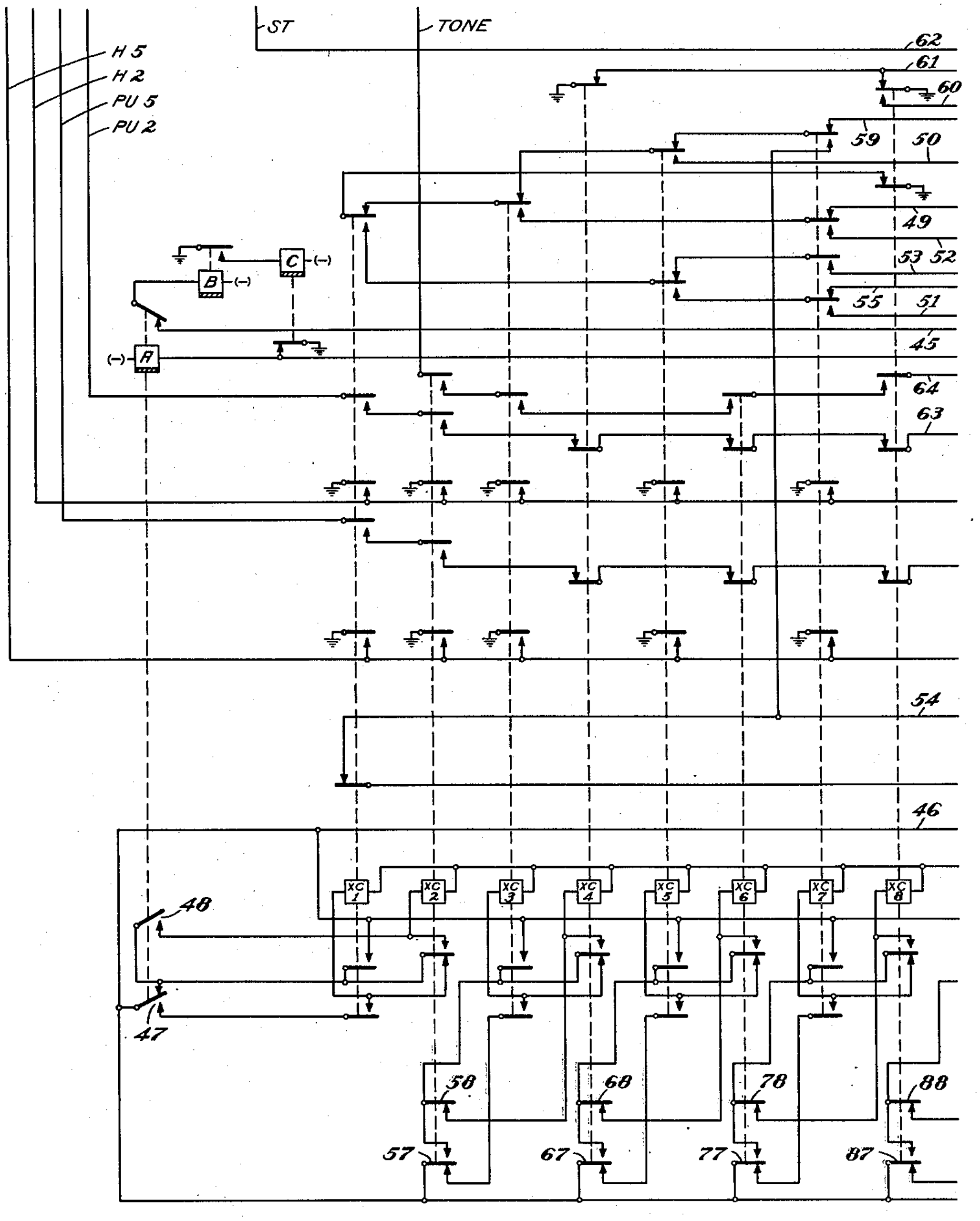
Figure 6:
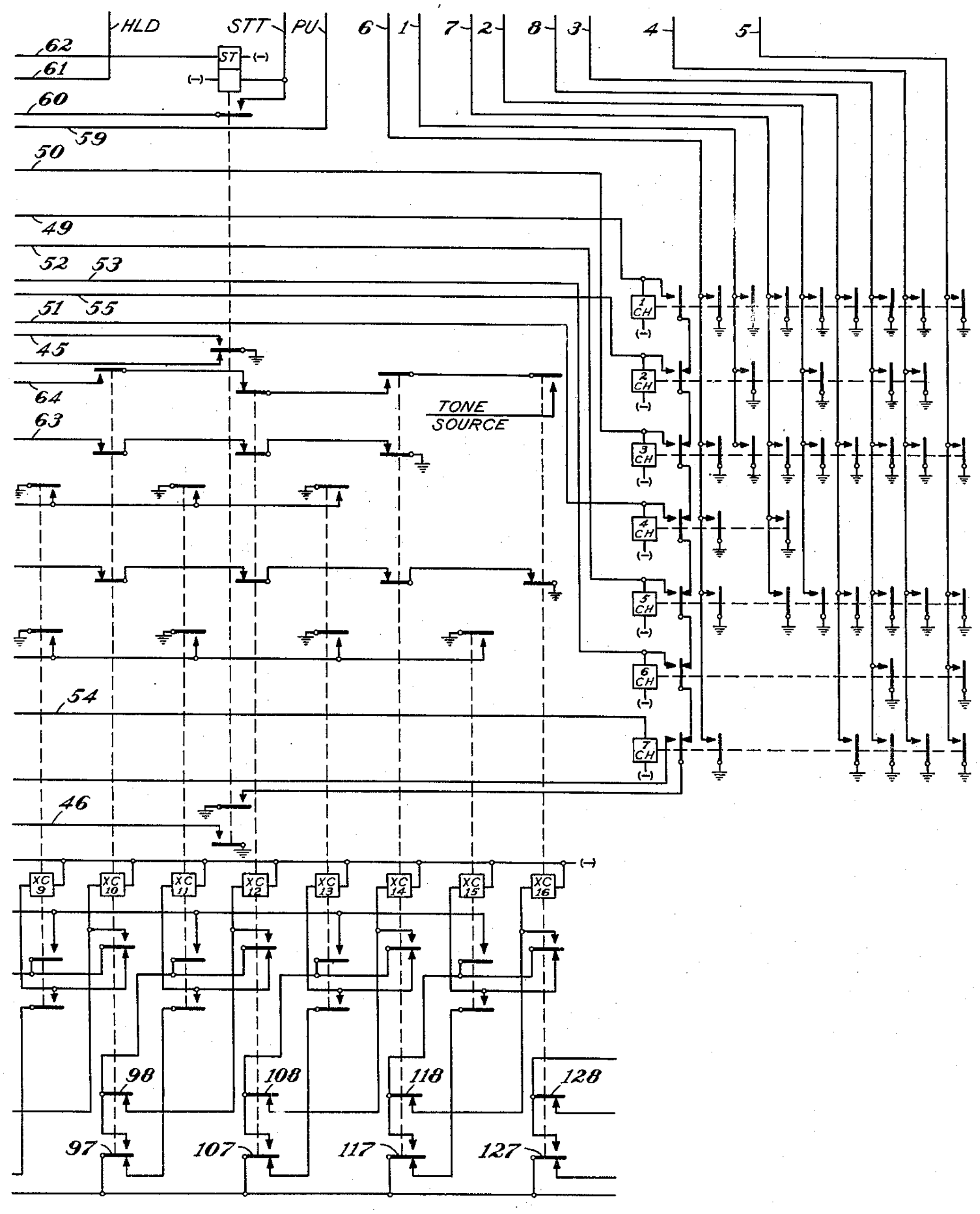

Referring to Figures 5 and 6, it will now be explained how the series of counting relays XC1 to XC16, inclusive, are operated by the impulse generating relays A, B and C for providing the various code ringing combinations, as well as for providing the time release feature.

With the system at rest, relay A is normally energized over a circuit extending through a break contact of relay C. When relay CI of any link circuit is operated in response to a call, as previously described, the ground applied to start conductor STT closes a circuit by way of the lower winding of start relay ST of Fig. 6 for operating this relay. Relay ST closes a circuit by way of conductor 45 for operating relay B, which in turn closes an obvious circuit for operating relay C. With relays C and ST energized, relay A is released for effecting the release of relay B, which in turn opens up and releases relay C. With relay C released, relay A is again energized, closing the above described circuit for again operating relay B, which in turn effects the operation of relay C. This cycle of operations, relays A, B and C being released in sequence, followed by the operation of these relays in sequence, is repeated as long as the ST relay remains operated. This cycling of the A, B and C relays provides the time generated impulses for controlling the operation of the counting relay chain, comprising relays XC1 to XC16, inclusive. It will be assumed that the release time of each of these impulse generating relays is approximately one third of a second. This means that they will go through a complete cycle of operations in approximately one second, thus providing a series of one second cycles for controlling the counting relay chain.

Relay CX1 is energized by the operation of relay ST over a circuit extending from ground, make contact of relay ST, conductor 46, make contact 47 of relay A, break contact of relay XC2 and winding of relay XC1 to negative battery. Relay XC1, in operating, closes a first locking circuit for itself which extends from grounded conductor 46, make contact of relay XC1 and the above mentioned break contact of relay XC2 to the winding of relay XC1.

When relay A releases, a second locking circuit is closed for relay XC1 extending from grounded conductor 46, break contact 47 of relay A, make contact of relay XC1 and winding of this relay to negative battery. The release of relay A also closes a circuit for operating relay XC2 which extends from grounded conductor 46, make contact of relay XC1, break contact 48 of relay A and winding of relay XC2 to negative battery. The operation of relay XC2 opens up the first locking circuit of relay XC1, but this relay is not released at this time because of the above described second locking circuit for this relay. The operation of relay XC2 closes a first locking circuit for itself extending from grounded conductor 46, make contact of relay XC1 and make contact of relay XC2 to the winding of this latter relay.

When relay A is next operated, the second locking circuit of relay XC1 is opened for effecting the release of this relay which in turn opens up the first locking circuit of relay XC2, but this latter relay does not release at this time because the operation of relay A closes a second locking circuit for relay XC2 before its first locking circuit is opened by the release of relay XC1. This second locking circuit for relay XC2 extends from grounded conductor 46, make contact 47 of relay A, make contact and winding of relay XC2 to negative battery. When relay A next releases this second locking circuit for relay XC2 is opened for effecting the release of this relay. When relay A is next operated, relay XC1 is again operated and locked and when relay A is next released relay XC1 is further locked, relay XC2 is operated and locked, all in the manner previously described. When relay A is next operated relay XC1 is released and when relay A is next released, relay XC2 is released all in the same manner as previously described.

It will thus be seen that counting relays XC1 and XC2 go through complete operating and release cycles in approximately two seconds, with relay XC1 being operated the first time when the common coder is seized and thereafter operated on alternate operations of relay A. Relay XC1 is released on the other alternate operations of relay A. Furthermore, relay XC2 is operated at each alternate release operation of relay A and is released at each other alternate release operation of relay A.

Contacts 57 and 58 of relay XC2 control the operations and releases of relays XC3 and XC4 in exactly the same manner that contacts 47 and 48 control the operations and releases of relays XC1 and XC2. Contacts 67 and 68 of relay XC4 control the cycling of relays XC5 and XC6 in exactly the same manner that contacts 57 and 58 control the cycling of relays XC3 and XC4. Contacts 77 and 78 of relay XC6 control the cycling of relays XC7 and XC8 in exactly the same manner that contacts 67 and 68 control the cycling of relays XC5 and XC6. Contacts 87 and 88 of relay XC8 control the cycling of relays XC9 and XC10 in exactly the same manner that contacts 77 and 78 control the cycling of relays XC7 and XC8. Contacts 97 and 98 of relay XC10 control the cycling of relays XC11 and XC12 in exactly the same manner that contacts 87 and 88 control the cycling of relays XC9 and XC10. Contacts 107 and 108 of relay XC12 control the cycling of relays XC13 and XC14 in exactly the same manner that contacts 97 and 98 of relay XC10 control the cycling of relays XC11 and XC12. Contacts 117 and 118 of relay XC14 control the cycling of relays XC15 and XC16 in exactly the same manner that contacts 107 and 108 control the cycling of relays XC13 and XC14. Contacts 127 and 128 are not used in the present disclosure, but are illustrated to indicate how additional counting relay pairs may be controlled if and when desired.

Since relays XC1 and XC2 complete a cycle of operations for every two cycles of the impulse generating relay A and since relays XC3 and XC4 go through a complete cycle of operations for every two cycles of relays XC1 and XC2, it will be seen that the number of channel circuits (two) which may be selected by the first group of counting relays XC1 and XC2 is doubled (providing four) by the provision of the second group of counting relays XC3 and XC4.

Furthermore, since relays XC5 and XC6 go through a cycle of operations for every two cycles of relays XC3 and XC4 (four cycles of relays XC1 and XC2), the number of channels is equal to eight or double the number of counting relay pairs. Consequently, for each pair of counting relays added to the group the number of channel circuits which may be selected is doubled. In other words, this arrangement provides a combination of selected circuits or channels which is equal to two raised to the power of the number of groups of counting relays, that is the number of circuits or channels selected by the counting relay chain increases in geometrical progression.

From the above discussion of this circuit arrangement, it will be seen that it takes approximately 2 seconds for relays XC1 and XC2 to complete a cycle of operations. It takes approximately 4 seconds for relays XC3 and XC4 to complete a cycle of operations. It takes approximately 8 seconds for relays XC5 and XC6 to complete a cycle of operations. It takes approximately 16 seconds for relays XC7 and XC8 to complete a cycle of operations. It takes approximately 32 seconds for relays XC9 and XC10 to complete a cycle of operations. It takes approximately 64 seconds for relays XC11 and XC12 to complete a cycle of operations. It takes approximately 128 seconds for relays XC13 and XC14 to complete a cycle of operations. It takes approximately 256 seconds for relays XC15 and XC16 to complete a cycle of operations. This provides a cycle of approximately 4 minutes and 16 seconds, with means for controlling channel circuits at any one of the combinations of one second cycles for providing code ringing and time release timing functions.

In describing the code ringing and the time release functions of the common coder circuit, it will be convenient to refer to the operations of relay A as being divided into a series of "on" and "off" positions. The "on" positions are those during which relay A is operated and the "off" positions are those during which relay A is released. From the above explanation, it will be noted that the position of relay XC1 is shifted at the beginning of each "on" of relay A, relay XC1 being operated at the beginning of each odd "on" and released at the beginning of each even "on." Furthermore, relay XC2 is operated at the beginning of each odd "off" period and is released at the beginning of each even "off" period.

Continuing with the operation of the counting relay chain, channel relay 1CH is energized during the second "on" period over a circuit extending from ground, break contact of relay XC8, break contact of relay XC1, make contact of relay XC3, break contact of relay XC7, conductor 49 and winding of relay 1CH to negative battery. Relay 1CH closes a locking circuit for itself extending from ground, make contact of relay ST, break contacts of relays 7CH to 2CH inclusive and make contact of relay 1CH to the winding of relay 1CH. It will be pointed out at the time that each channel relay (except the last), when operated, is locked over the circuit to ground at the make contact of relay ST until the next succeeding channel relay is operated, thus providing an overlap so that a code conductor leading to the connector link will not be interrupted when this code conductor is to be maintained energized by a succeeding channel relay.

Returning to the operation of the channel relays, relay 2CH is operated during the third "on" period over a circuit extending from ground, break contact of relay XC8, make contact of relay XC1, make contact of relay XC5, break contact of relay XC7 and conductor 55 to the winding of relay 2CH. The operation of relay 2CH closes a locking circuit for itself and opens up the locking circuit for relay 1CH, which is released at this time.

Relay 3CH is operated during the fourth "on" period over a circuit extending from ground, break contact of relay XC8, break contact of relay XC1, break contact of relay XC3, make contact of relay XC5, conductor 50 and winding of relay 3CH to negative battery. The operation of relay 3CH closes a locking circuit for itself and opens the locking circuit for relay 2CH for effecting the release of this latter relay.

Relay 4CH is operated during the fifth "on"

period over a circuit extending from ground, break contact of relay XC8, make contact of relay XC1, make contact of relay XC5, make contact of relay XC7, conductor 51 and winding of relay 4CH to negative battery. Relay 4CH closes a locking circuit for itself and opens the locking circuit for relay 3CH for effecting the release of this latter relay.

Relay 5CH is operated during the sixth "on" period over a circuit extending from ground, break contact of relay XC8, break contact of relay XC1, make contact of relay XC3, make contact of relay XC7, conductor 52 and winding of relay 5CH to negative battery. Relay 5CH closes a locking circuit for itself and opens the locking circuit for relay 4CH for effecting the release of this latter relay.

Relay 6CH is operated during the seventh "on" period over a circuit extending from ground, break contact of relay XC8, make contact of relay XC1, break contact of relay XC5, make contact of relay XC7, conductor 53 and winding of relay 6CH to negative battery. Relay 6CH closes a locking circuit for itself and opens the locking circuit of relay 5CH for effecting the release of this latter relay.

Relay 7CH is operated during the eighth "on" period over a circuit extending from ground, break contact of relay XC8, break contact of relay XC1, break contact of relay XC3, break contact of relay XC5, make contact of relay XC7, conductor 54 and winding of relay 7CH to negative battery. Relay 7CH closes a locking circuit for itself which extends through a break contact of relay XC1 and opens up the locking circuit for 6CH for effecting the release of this latter relay. When relay XC1 is energized during the ninth "on" period, the above described locking circuit for relay 7CH is opened for effecting the release of this latter relay.

It will thus be seen that channel relays 1CH to 7CH, inclusive, are sequentially operated and released, with each of these relays being operated during succeeding "on" periods of the A relay cycles. Since the cycles of the A relay comprise approximately one second and since there are seven channel relays in the system, an approximately 7 second ringing cycle is provided. Following this 7 second ringing cycle, the impulse generating relays and the counting relays continue operating in the above described manner for another approximate 7 second interval, but during this portion of the relay operation the channel relays are not operated because relay XC8 is operated during the eighth "off" period (after relay 7CH has been operated) for opening up the above traced connection to ground which operates these channel relays. During the 16th "off" period, relay XC8 is released and, since the impulse generating relays and the counting relays continue operating with relay XC8 in its normal position, another ringing cycle is effective for operating the channel relays in the manner previously described. It will be understood that during the complete 4 minute and 16 second (approximate) cycle above mentioned, the circuits for controlling the channel relays are repeatedly effective since counting relays XC1 and XC8, inclusive, which control these channel relay circuits repeat their cycles in the above described order. The counting relays XC9 and XC16, (in combination with relays XC1 to XC8 inclusive) are used to provide the timing for the time release portion of the circuit, as will be later explained.

Referring to the contacts on channel relays 1CH to 7CH, inclusive, it will be observed that, when a connector link selects code conductor #1, one long ring will be provided because conductor #1 is energized during the time that relays 1CH, 2CH and 3CH are in their operated positions. Code conductor #2 provides one long and one short ring, separated by a pause because this code conductor is energized by relays 1CH, 2CH, 3CH and 5CH. Code conductor #3 provides two long rings with a pause between because this conductor is energized when relays 1CH, 2CH, 3CH, 5CH, 6CH and 7CH are in their operated positions. When code conductor #4 is selected, one long and two short rings are provided because this conductor is energized by channel relays 1CH, 2CH, 3CH, 5CH and 7CH. When code conductor #5 is selected, two short and one long rings are provided because this conductor is energized by the operation of relays 1CH, 3CH and 5CH to 7CH, inclusive. When code conductor #6 is selected the ring provided is one short, one long and one short because this conductor is energized by the 1, 3, 4, 5 and 7 channel relays. When code conductor #7 is selected one short and one long rings are provided because this conductor is energized by the 1, 3, 4 and 5 channel relays. When code conductor #8 is selected four short rings are provided because this conductor is only energized by the operations of the 1, 3, 5 and 7 channel relays.

It will be recalled that a CI relay of a connector link circuit may be energized at the beginning of a code cycle. This is because pick-up conductor PU is connected to ground at a break contact of relay XC8, by way of break contacts of relays XC7, XC5, XC3 and XC1. Consequently, when relay XC1 is operated during the first "on" period, the pick-up conductor is disconnected from ground so that another connector link cannot start the application of a ringing code to a called line during a code cycle, thus preventing the application of a false or incomplete code to the line. Since the pick-up conductor is not again energized until the 16th "on" period with relays XC8, XC1, XC3, XC5 and XC7 all in their released positions and since this 16th "on" period is well after the code ringing portion of the cycle, it is proper to then energize the pick-up conductor so that one or more connector links may operate their CI relays.

As above mentioned, an operated CI relay is locked in its operated position to ground on hold conductor HLD. Since this conductor is grounded at a break contact of relay XC8, at any time the pick-up conductor is energized a locking circuit is provided for the CI relays. Furthermore, since this hold conductor is not de-energized until relay XC8 and relay XC4 are both energized at the same time, which happens during the 10th "off" period, it follows that an operated CI relay will be locked in its operated position until after the code ringing portion of the cycle is completed, thus providing means for preventing the interruption of a code once started even though the connection is released. It will also be obvious that any CI relay which is locked operated provides a ground to conductor STT for holding relay ST operated and that relay XC8 provides a locking ground for locking relay ST operated by way of conductor 60, thus providing means for maintaining the counting and channel relay circuits active until the end of a complete code cycle at which time (in the 16th "off" period) the locking circuit for relay ST is opened by the release of relay XC8.

The time release portion of the circuit will now be explained. As above mentioned it takes approximately 256 seconds for the counting relays XC1 to XC16, inclusive, to go through one complete cycle of operations before a second cycle is started. Referring to the connector link circuit of Figure 2, it will be noted that the timer relay TM will be operated by way of its lower winding if the call is unanswered when pick-up interrupter common conductor PU2 is energized. The circuit from this common pick-up interrupter extends through a break contact of relay AB (de-energized because the call is unanswered), break contact of relay TM, make contact of relay SAP, break contact of relay AB and lower winding of relay TM to negative battery. Common pick-up conductor PU2 is energized at the beginning of each 2 minute, 6 second (approximate) cycle by way of a circuit extending through make contacts of relays XC1 and XC2, break contacts of relays XC4, XC6, XC8, conductor 63, break contacts of relays XC10, XC12 and XC14. This circuit through these particular relay contacts is only completed at the beginning of the 2 minute, 6 second cycle and is maintained opened throughout the remainder of such cycle.

In other words, common pick-up interrupter PU2 is energized at intervals of approximately 128 seconds. This provides a 2–4 (approximate) minute permanent signal time release feature, since the operation of a TM relay closes a locking circuit for itself and opens up the above described energizing circuit at the time the relay operates. The operation of relay TM also removes direct ground from stick conductor STK (which holds the finder portion of the link in its operated position) and substitutes therefor a ground by way of a make contact of relay TM and a break contact of relay AB to hold conductor H2 which is energized at any time conductor PU2 is energized and is maintained energized until just a short interval before conductor PU2 is next energized. This is because conductor H2 will be energized as long as any one of the counting relays XC1, XC2, XC3, XC5, XC7, XC9, XC11 or XC13 is energized. Recalling the geometrical progression of operations of these counting relays, it will be obvious that some one of these counting relays is in its operated position for applying ground to conductor H2 until the end of the 127th "off" period, at which time conductor H2 is momentarily de-energized to permit the release of a line finder by removing ground from conductor STK as above mentioned. Conductor H2 is again energized by the operation of relay XC1 before conductor PU2 is energized by the operation of both relays XC1 and XC2, thus providing sufficient time to release out any desired connection.

It will be apparent that in the event of the closure of the circuit to the lower winding of relay TM, just after conductor PU2 is momentarily energized, it will then be necessary for the circuit to measure off approximately 2 minutes and 6 seconds before conductor PU2 is again energized for operating relay TM. Then it is necessary to measure off another two minutes and 6 seconds (approximately) before conductor H2 is de-energized for releasing the connection. This means that under certain conditions it will be approximately 4 minutes and 12 seconds before the permanent signal release feature is effective, while under other conditions it will be effective in approximately 2 minutes and 6 seconds.

Pick-up conductor PU5 is not energized until approximately 256 seconds after the start of a cycle, since this conductor extends through contacts on the same relays as conductor PU2 and in addition it extends through a break contact of relay XC16, which takes twice as long to complete its cycle as relay XC14. Consequently, during the talking condition of the connector link, relay TM may be energized by way of its upper winding and make contacts of relay AB and hold conductor H5 is momentarily de-energized the same as above described for conductor H2, except by the additional make contact of relay XC15, which operates in a cycle twice as long as relay XC13. Therefore, the connection may be released while it is in talking condition by means of the 4 minute, 16 second (minimum) or the 8 minute, 32 second (maximum) cycle provided by the PU5 and H5 common conductors. This type of connection may likewise require variable times between the minimum and maximum above mentioned.

Relay TM is differentially connected so that it will be de-energized if pick-up conductor PU5 is energized with the connector in its talking condition, if relay TM had been previously energized by pick-up conductor PU2. This is to render the control of relay TM dependent on the pick-up and hold circuits determined by the talking or non-talking condition of the connector. Without this differential arrangement it would require two separate relays for the two separate timing functions.

A disconnect tone is applied to a talking connection by way of make contacts of relay AB and TM of the link circuit and by way of the common tone conductor, if relay TM has been maintained in its energized position for approximately 30 seconds less than the conversation time release period. This tone is, therefore, applied sufficiently in advance of the automatic release of a connection to give the talking parties ample warning. The common tone circuit extends through make contacts of relays XC2, XC3, XC6, XC8, conductor 64, make contact of relay XC10, break contact of relay XC12 and make contacts of relays XC14 and XC16 to the tone source. By analyzing the time during the complete cycle at which these relay contacts are in their closed positions it will be determined that the tone is connected momentarily to the common tone conductor approximately 30 seconds before the release function is effected.

Although no line nor line finder circuits have been shown in the present disclosure, it will be obvious to those skilled in this art that it is only necessary to provide line circuits of the lock-out type, such for example as shown in the above mentioned Powell patent, to maintain such lines disconnected from all trunk or link circuits when they are released by the common time release circuit removing ground from conductor STK.

Although one specific embodiment of the present invention has been shown, it is to be understood that various rearrangements of the circuits may be made without departing from the spirit of the invention.

What I claim is:

1. In a telephone system, an exchange, lines in said exchange, a plurality of trunk circuits common to said lines, means controlled over one of said lines for connecting it to and disconnecting it from any one of said trunk circuits, a time release mechanism common to said trunk circuits, a release relay associated with each of said trunk circuits, additional means including said release relay in its operated position for disconnecting said one line from a trunk circuit to which it has been connected, means including said time release mechanism for measuring off a distinctive time interval, means operative under the control of said mechanism for causing said release relay to operate at the end of said time interval, and means operative under the control of said mechanism for releasing said release relay whereby the disconnection of said one line from said trunk circuit by said additional means is prevented.

2. In a telephone system, an exchange, lines in said exchange, a plurality of trunk circuits common to said lines, means controlled over one of said lines for connecting it to and disconnecting it from any one of said trunk circuits, a time release mechanism common to said trunk circuits, a release relay associated with each of said trunk circuits, additional means including said release relay in its operated position for disconnecting said one line from a trunk circuit to which it has been connected, means including said time release mechanism for measuring off two distinctive time intervals, means operative under the control of said mechanism for causing said release relay to operate at the end of one of said time intervals, means operative under the control of said mechanism for releasing said release relay whereby the disconnection of said one line from said trunk circuit by said additional means is prevented, and means operative under the control of said mechanism for causing said relay to again operate at the end of the other of said time intervals.

3. In combination; a pulse generating relay; means for operating said pulse generating relay through a plurality of cycles; a plurality of counting relay groups operative through a plurality of steps, each group of which comprises a first and second counting relay; means for causing the first of said relay groups to complete only one operating cycle in response to two of the operating cycles of said pulse generating relay; means for causing each of said remaining relay groups to complete only one operating cycle in response to two of the operating cycles of its preceding relay group; a plurality of link circuits; a pair of time control conductors common to said link circuits; means including said counting relay groups for applying pairs of timed pulses in combination to said time control conductors; and means controlled by said pairs of timed pulses for effecting the release of said link circuits.

4. In combination; a pulse generating relay; means for operating said pulse generating relay through a plurality of cycles; a plurality of counting relay groups operative through a plurality of steps, each group of which comprises a first and second counting relay; means for causing the first of said relay groups to complete only one operating cycle in response to two of the operating cycles of said pulse generating relay; means for causing each of said remaining relay groups to complete only one operating cycle in response to two of the operating cycles of its preceding relay group; a plurality of link circuits; a pair of time control conductors common to said link circuits; means including said counting relay groups for applying pairs of timed pulses in combination to said time control conductors, said timed pulses having a ratio to each other of more than ten to one; and means controlled by said pairs of timed pulses for effecting the release of said link circuits.

5. In combination; a pulse generating relay; means for operating said pulse generating relay through a plurality of cycles; a plurality of counting relay groups operative through a plurality of steps, each group of which comprises a first and a second counting relay; means for causing the first of said relay groups to complete only one operating cycle in response to two of the operating cycles of said pulse generating relay; means for causing each of said remaining relay groups to complete only one operating cycle in response to two of the operating cycles of its preceding relay group; a plurality of link circuits; a pair of time control conductors common to said link circuits; a plurality of coded channel conductors; and means including said counting relay groups for applying pairs of timed pulses in combination to said time control conductors and for applying timed pulses to said coded channel conductors.

6. In a telephone system, an exchange, lines terminating in said exchange, a connecting link, selectively controlled means including a first series of counting relays associated with said link for establishing a connection between a calling line and a called one of said lines, a combined coder and time release mechanism including a plurality of pairs of counting relays, means for causing the first pair of counting relays to operate through a plurality of cycles, means for causing each succeeding pair of counting relays to operate through a cycle in response to two operating cycles of the preceding pair of counting relays; means including contacts on a portion only of said counting relay pairs for restoring said link to normal after a predetermined time following the seizure of the link, and means including contacts on all of said counting relay pairs for restoring said link to normal after a longer time than said predetermined time following the seizure of the link.

7. In a telephone system, an exchange, party lines terminating in said exchange, a connecting link, selectively controlled means including a first series of counting relays associated with said link for establishing a connection between a calling line and a called one of said party lines, a combined coder and time release mechanism including a plurality of pairs of counting relays, means for causing the first pair of counting relays to operate through a plurality of cycles, means for causing each succeeding pair of counting relays to operate through a cycle in response to two operating cycles of the preceding pair of counting relays, means including contacts on a portion only of said counting relay pairs for restoring said link to normal after a predetermined time interval is measured off following the seizure of the link, means including contacts on all of said counting relay pairs for restoring said link to normal after a time interval has been measured off which is longer than said predetermined time interval following the seizure of the link, and means including contacts on a portion only of said counting relay pairs for applying code ringing signals to said party lines.

8. In a telephone system, an exchange, party lines terminating in said exchange, a connecting link, selectively controlled means including a first series of counting relays associated with said link for establishing a connection between a calling line and a called one of said party lines, a combined coder and time release mechanism including a plurality of pairs of counting relays, means for causing the first pair of counting relays to operate through a plurality of cycles, means for causing each succeeding pair of counting relays to operate through a cycle in response to two operating cycles of the preceding pair of counting relays, means including contacts on a portion only of said counting relay pairs for restoring said link to normal after a predetermined time interval is measured off following the seizure of the link, means including contacts on all of said counting relay pairs for restoring said link to normal after a time interval has been measured off which is longer than said predetermined time interval following the seizure of the link, means including contacts on a portion only of said counting relay pairs for applying code ringing signals to said party lines, and means including contacts on a portion only of said counting relay pairs for applying a warning signal to said connection prior to the restoration of said link to normal after said longer interval of time.

WINFRED T. POWELL.

REFERENCES CITED

The following references are of record in the file of this patent:

UNITED STATES PATENTS

| Number | Name | Date |
| --- | --- | --- |
| 2,022,503 | Evers | Nov. 26, 1935 |
| 2,120,419 | Stokely | June 14, 1938 |
| 2,239,902 | Peterson | Apr. 29, 1941 |
| 2,315,378 | Powell | Mar. 30, 1943 |
| 2,320,885 | Powell | June 1, 1943 |
| 2,325,877 | Powell | Aug. 3, 1943 |

Certificate of Correction

Patent No. 2,513,049 June 27, 1950

WINFRED T. POWELL

It is hereby certified that error appears in the printed specification of the above numbered patent requiring correction as follows:

Column 5, line 60, for "sounding" read *counting*;

and that the said Letters Patent should be read as corrected above, so that the same may conform to the record of the case in the Patent Office.

Signed and sealed this 21st day of August, A. D. 1951.

[SEAL]

THOMAS F. MURPHY,
*Assistant Commissioner of Patents.*